(12) United States Patent
Mahajan et al.

(10) Patent No.: US 12,500,778 B2
(45) Date of Patent: Dec. 16, 2025

(54) SYSTEMS AND METHODS FOR MANAGING PUBLIC KEY INFRASTRUCTURE CERTIFICATES FOR COMPONENTS OF A NETWORK

(71) Applicant: Verizon Patent and Licensing Inc., Basking Ridge, NJ (US)

(72) Inventors: Amit Mahajan, Bridgewater, NJ (US); Jayesh Kumar Laad, Ashland, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 484 days.

(21) Appl. No.: 16/883,590

(22) Filed: May 26, 2020

(65) Prior Publication Data
US 2021/0377054 A1  Dec. 2, 2021

(51) Int. Cl.
*H04L 9/32* (2006.01)
*G06F 9/455* (2018.01)
*H04L 9/40* (2022.01)

(52) U.S. Cl.
CPC ............ *H04L 9/3268* (2013.01); *G06F 9/455* (2013.01); *H04L 63/0823* (2013.01); *H04L 2209/76* (2013.01)

(58) Field of Classification Search
None
See application file for complete search history.

(56) References Cited

U.S. PATENT DOCUMENTS

| | | | |
|---|---|---|---|
| 9,271,142 B1* | 2/2016 | Broch | H04W 4/50 |
| 10,205,719 B2* | 2/2019 | Feng | H04L 12/6418 |
| 10,277,406 B1* | 4/2019 | Veladanda | H04L 9/0825 |
| 10,367,647 B2* | 7/2019 | Feng | H04L 9/30 |
| 10,797,888 B1* | 10/2020 | Natarajan | H04L 63/0428 |
| 10,958,539 B1* | 3/2021 | Raj | H04L 41/0806 |

(Continued)

FOREIGN PATENT DOCUMENTS

| | | | | |
|---|---|---|---|---|
| WO | WO-2017197560 A1 * | 11/2017 | | G06F 21/44 |
| WO | WO-2018047399 A1 * | 3/2018 | | H04L 9/0827 |

(Continued)

OTHER PUBLICATIONS

NFV-ISG, Network Functions Virtualisation (NFV): "NFV Security; Security and Trust Guidance". ETSI GS NFV-SEC 003 V1.1.1 (Dec. 2014).*

(Continued)

*Primary Examiner* — Syed A Zaidi
*Assistant Examiner* — Vadim Savenkov

(57) ABSTRACT

A device may determine that a network function of a network has been instantiated to facilitate communication via the network. The device may request a certificate authority to provide a certificate for the network function. The device may receive, from the certificate authority, the certificate. The device may generate a certificate profile to enable other network functions of the network to authenticate communications with the network function, wherein the certificate profile identifies: the certificate and a certification protocol. The device may provide, to the network function, the certificate profile to cause the network function to use the certificate to communicate with the other network functions.

20 Claims, 13 Drawing Sheets

(56) References Cited

U.S. PATENT DOCUMENTS

| | | | | |
|---|---|---|---|---|
| 2008/0022355 | A1* | 1/2008 | Khosravi | H04L 61/5014 726/1 |
| 2009/0227274 | A1* | 9/2009 | Adler | H04W 8/18 455/70 |
| 2013/0035065 | A1* | 2/2013 | Adler | H04L 63/083 455/411 |
| 2015/0180904 | A1* | 6/2015 | Kennedy | G06F 21/57 726/1 |
| 2015/0215308 | A1* | 7/2015 | Manolov | H04L 67/1036 709/229 |
| 2017/0054710 | A1* | 2/2017 | Xiong | G06F 9/45558 |
| 2017/0228559 | A1* | 8/2017 | Jackson | H04L 63/083 |
| 2017/0288971 | A1* | 10/2017 | Jayaraman | H04L 41/5051 |
| 2017/0338968 | A1* | 11/2017 | Feng | H04L 63/0823 |
| 2018/0101397 | A1* | 4/2018 | Sergeev | G06F 11/1484 |
| 2018/0176023 | A1* | 6/2018 | Prickett | H04L 9/0822 |
| 2018/0205722 | A1* | 7/2018 | Getschmann | H04L 63/0876 |
| 2018/0227182 | A1* | 8/2018 | Patton | H04L 41/0806 |
| 2018/0248867 | A1* | 8/2018 | Liu | H04L 63/0823 |
| 2019/0104022 | A1* | 4/2019 | Power | H04L 67/12 |
| 2019/0149408 | A1* | 5/2019 | Li | H04L 41/40 709/223 |
| 2019/0253264 | A1* | 8/2019 | Singaravelu | H04L 41/28 |
| 2019/0334781 | A1* | 10/2019 | Caldwell | H04L 41/12 |
| 2019/0349357 | A1* | 11/2019 | Shukla | H04L 63/20 |
| 2019/0356494 | A1* | 11/2019 | Chmara | H04L 9/3247 |
| 2020/0097315 | A1* | 3/2020 | Faynberg | H04L 9/3263 |
| 2020/0177632 | A1* | 6/2020 | Han | H04L 61/00 |
| 2020/0295951 | A1* | 9/2020 | Kottapalli | H04L 63/0823 |
| 2020/0396088 | A1* | 12/2020 | Master | H04W 12/043 |
| 2021/0021462 | A1* | 1/2021 | Chaignon | H04L 45/586 |
| 2021/0306326 | A1* | 9/2021 | Bykampadi | H04L 63/0281 |
| 2021/0314171 | A1* | 10/2021 | Choyi | H04L 9/3247 |
| 2021/0352472 | A1* | 11/2021 | Ganesan | H04L 63/0272 |

FOREIGN PATENT DOCUMENTS

| | | | | |
|---|---|---|---|---|
| WO | WO-2018147276 | A1 * | 8/2018 | G06F 21/33 |
| WO | WO-2019194665 | A1 * | 10/2019 | G06F 9/546 |
| WO | WO-2021008716 | A1 * | 1/2021 | H04W 12/069 |

OTHER PUBLICATIONS

Schaad, J., and M. Myers. "RFC 5272: Certificate Management over CMS (CMC)." (2008).*

J. Elek, D. Jocha and R. Szabo, "Network Function Chaining in DCs: The Unified Recurring Control Approach," 2015 Fourth European Workshop on Software Defined Networks, Bilbao, Spain, 2015, pp. 13-18, doi: 10.1109/EWSDN.2015.54.*

* cited by examiner

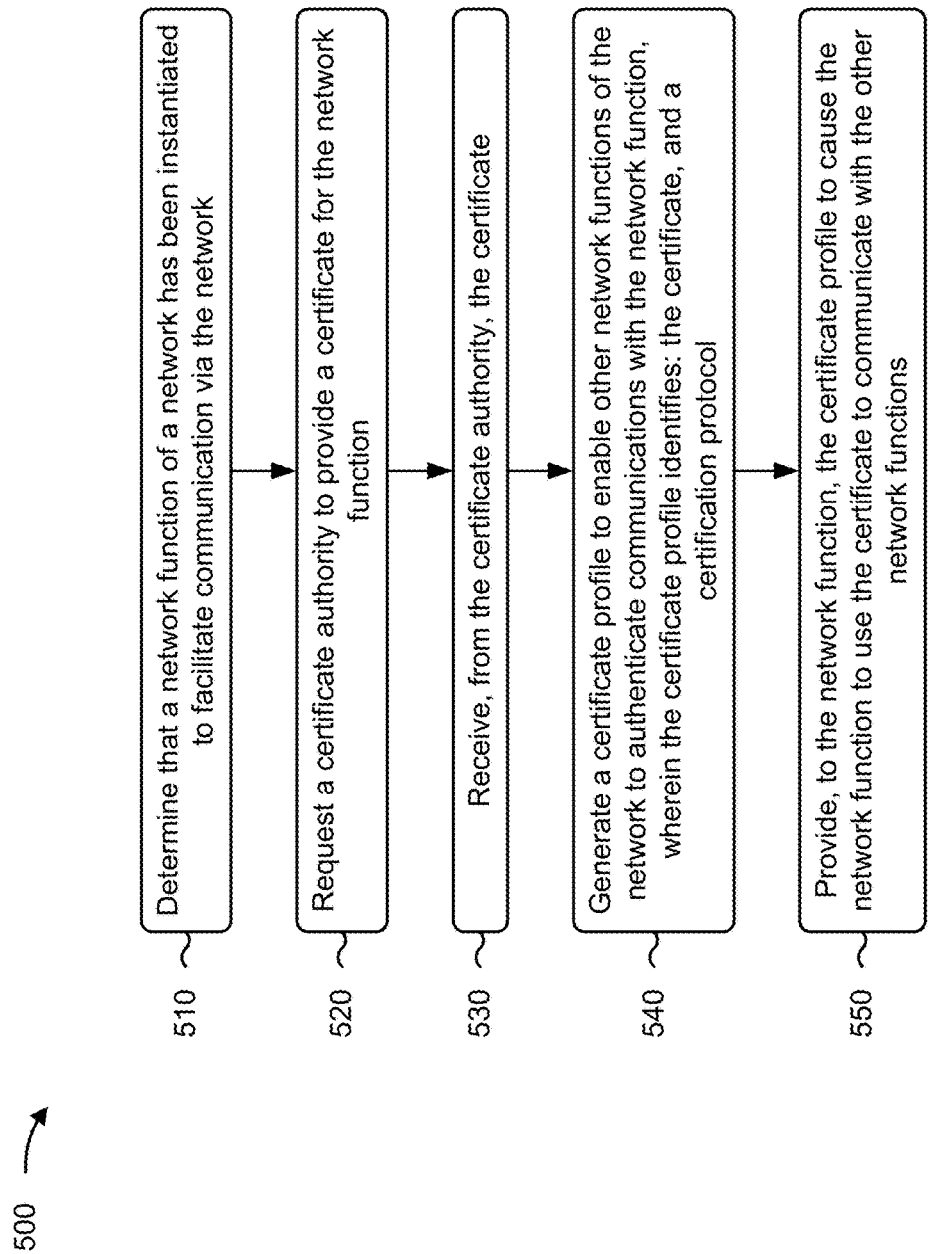

SYSTEMS AND METHODS FOR MANAGING PUBLIC KEY INFRASTRUCTURE CERTIFICATES FOR COMPONENTS OF A NETWORK

BACKGROUND

A public key infrastructure (PKI) is a set of hardware, software, policies, and procedures that that provides a framework of encryption and data communication standards used to secure communications over a network.

BRIEF DESCRIPTION OF THE DRAWINGS

FIG. 5 is a flow chart of an example process for managing public key infrastructure certificates for components of a network.

DETAILED DESCRIPTION OF PREFERRED EMBODIMENTS

Figure 1A:
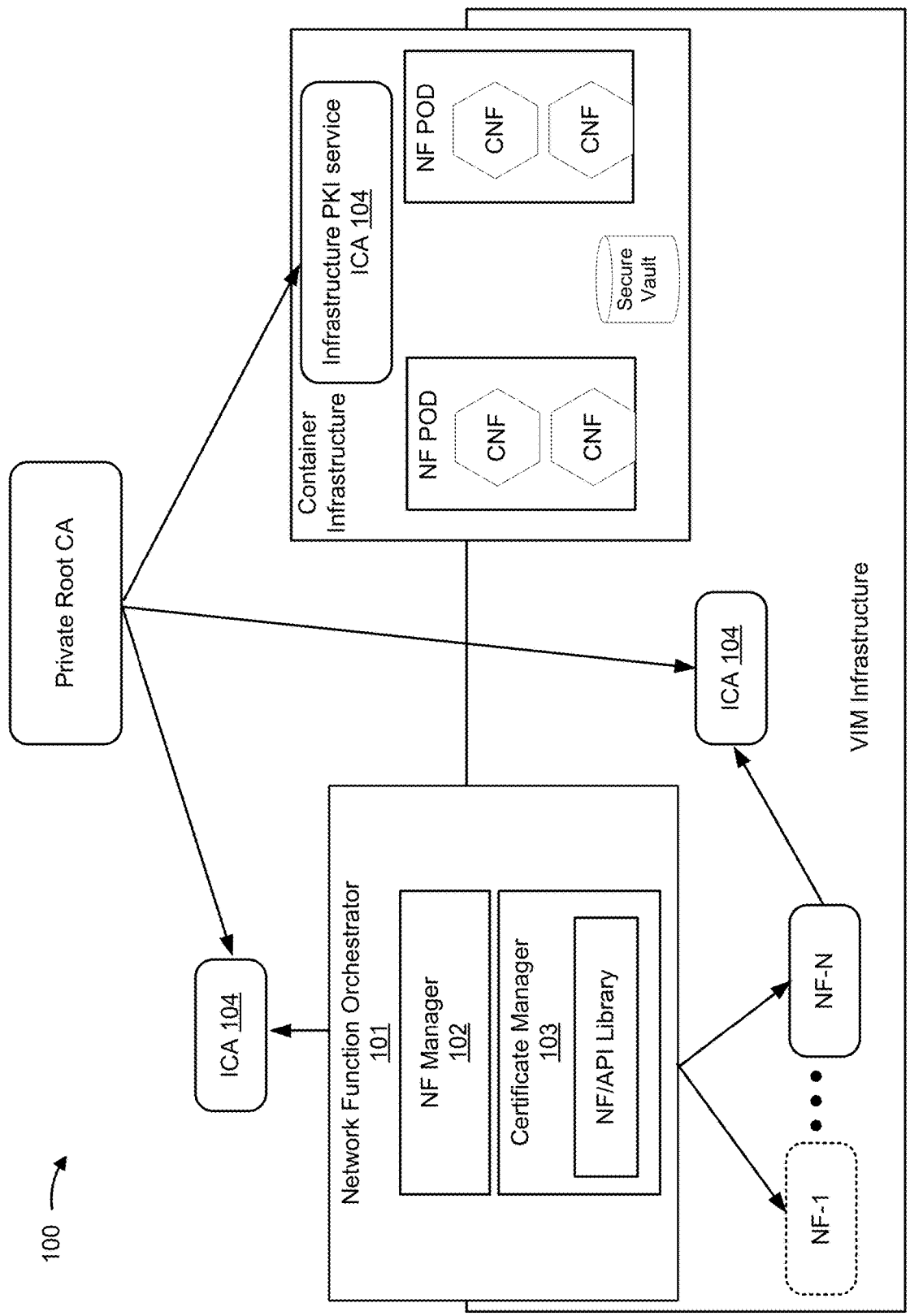
FIGS. 1A-1I are diagrams of one or more example implementations described herein.
Figure 1B:
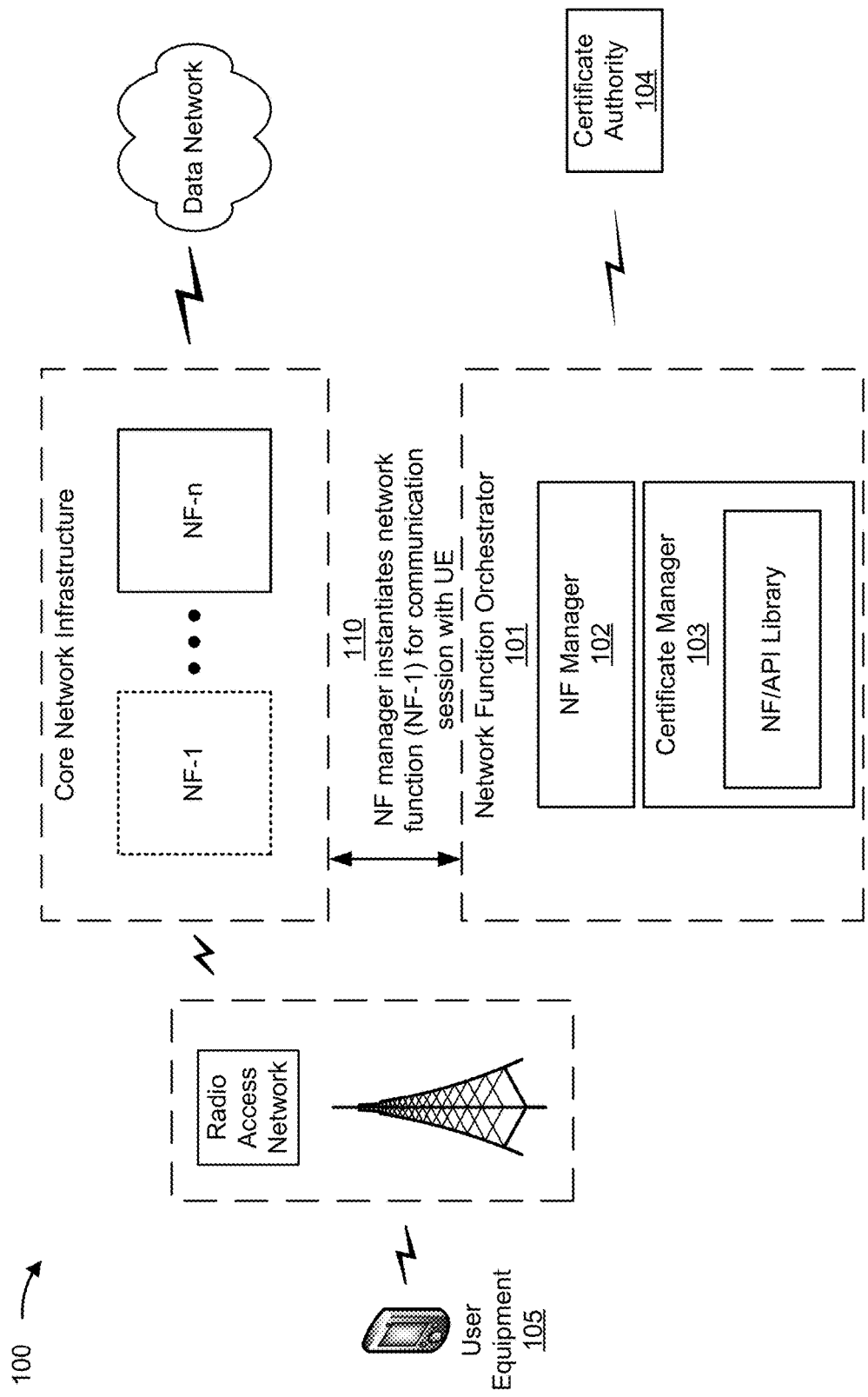

The following detailed description of example implementations refers to the accompanying drawings. The same reference numbers in different drawings may identify the same or similar elements.

A network may include an entity (e.g., a device, an application, a virtual machine, a container, and/or the like) configured to perform a function and/or a service associated with the network. For example, an entity may be configured to perform a network function, such as a switching function, a routing function, a load balancing function, a firewall function, a gateway function, an intrusion detection function, and/or the like.

To provide security to ensure the integrity of data transmitted through the network, an entity may establish a trust relationship with another entity and data transmitted between the entities may be encrypted. The trust relationship may refer to a process that enables an entity to verify, with a certain degree of confidence, that data purporting to come from another entity (e.g., data including a source address associated with the other entity) was transmitted to the entity by the other entity. Encrypting the data transmitted between the entities may protect the data from being altered or changed prior to being received by a receiving one of the entities.

Commonly, an entity utilizes a public key infrastructure (PKI) to establish a trust relationship with another entity and/or to encrypt data transmitted between the entities. A PKI is a security architecture that enables the establishment of a trust relationship and/or the secure transfer of data in a network through a process that binds a public key with an identity of an entity.

The binding of the public key with the identify of an entity may be established through a process of registration and issuance of a certificate at, and by, a public certificate authority (CA). The public CA may act as a trusted third party that an entity may rely upon for verification of the identity of another entity.

For example, an entity implemented in a network may generate a private key and a public key for encrypting and decrypting data. The entity may generate a certificate signing request (CSR) for requesting a certificate from the public CA. The CSR may include information identifying the entity (e.g., information identifying a device associated with the entity (e.g., a MAC address, a serial number, and/or the like), information identifying an Internet service provider (ISP) associated with the entity and/or the network (e.g., a name of the ISP, a physical address associated with the ISP, an email address associated with the ISP, and/or the like), and/or the like), the public key, and/or the like.

The entity may transmit the CSR to a registration authority. The registration authority verifies and/or authenticates the identity of the entity based on the information included in the CSR and forwards the CSR to a public CA. The public CA provides the CSR to a certificate server that generates a certificate for the entity based on the public key. The certificate may include the public key and may be stored in a public database and/or transmitted to the entity.

The certificate, the public key, and/or the private key may enable the entity to establish a trust relationship with another entity. For example, data transmitted by the entity to the other entity may include a digital signature and/or the certificate. The entity may encrypt the digital signature using the private key. The other entity may query the public CA that issued the certificate to determine that the certificate is valid. The other entity may use the public key of the entity to decrypt the digital signature. The other entity may determine that the data was transmitted by the entity based on successfully decrypting the digital signature.

The data transmitted by the entity may be encrypted based on the public key associated with the other entity. For example, the entity may request the public key associated with the other entity from the other entity, obtain the public key associated with the other entity from the public database, and/or the like. The entity may utilize the public key associated with the other entity to encrypt the data. The other entity receives the encrypted data and utilizes the private key associated with the other entity to decrypt the data.

In various networks, a network function may be realized by a virtual machine or a container implemented on a physical device (e.g., a virtual network function). Utilizing virtual network functions may allow a structure of the network to be modified in response to current network conditions. For example, a new virtual network function can be added to the network to alleviate network congestion. However, the virtual network function may be configured to communicate utilizing a limited set of protocols. The set of protocols may not include a protocol utilized to communicate with a public CA thereby preventing the virtual network function from obtaining a certificate. Thus, a virtual network function may be configured to include a protocol for communicating with the public CA thereby increasing an amount of computing resources (e.g., processing resources, memory resources, communicating resources, and/or the like) required to implement the virtual network function relative to a virtual network function that does not include the protocol for communicating with the public CA.

Additionally, when the new virtual network function is configured to communicate with a public CA, an amount of time required to complete the process for obtaining a certificate for the new virtual network function may impede a network operator from effectively modifying the network to address current network conditions.

Further, obtaining the certificate for the new virtual network function from a public CA may create a security vulnerability associated with the network. For example, a malicious actor may be able to falsely obtain a certificate by impersonating as a virtual network function associated with a particular entity more easily relative to impersonating a network function implemented on a physical device (e.g., a physical network function).

The publication or storing of a certificate issued for the new virtual function may also create a security vulnerability for the network. For example, the certificate may include information identifying the virtual network function, information identifying a device on which the virtual network function is implemented, information identifying an entity associated with the network (e.g., an ISP), and/or the like. This information may be obtained and used by a malicious actor to determine a topology of the network and/or other information about the network that the malicious actor may use to attack the network. If the malicious actor attacks the network, computing resources (e.g., processor resources, memory resources, communication resources, and/or the like) may be utilized to identify the attack on the network, investigate suspicious activity associated with the attack, perform one or more actions to mitigate damage caused by the attack, and/or the like.

Some implementations described herein may implement a private public key infrastructure (e.g., a private PKI) that enables an entity included in a network to establish a trust relationship and/or to communicate encrypted data with another entity included in the network. The private PKI may include a network function orchestrator, a life cycle manager, and/or a private CA. The network function orchestrator may instantiate a virtual network function (e.g., an entity) in the network and may provide information indicating that the virtual network function has been instantiated to the life cycle manager.

The life cycle manager may generate a CSR for the virtual network function based on the provided information and may transmit the CSR to a private CA associated with the network. Because the life cycle manager requests and obtains the certificate for the virtual network function, the virtual network function can be configured to include a limited set of protocols (e.g., a set of protocols that does not include a protocol used solely for communicating with a public CA). In this way, fewer computing resources may be utilized to implement the virtual network function relative to a corresponding virtual network function that obtains a certificate from a public CA.

The private CA may verify the identity of the virtual network function based on determining that the virtual network function has been instantiated in the network, receiving the CSR from the life cycle manager, and/or the like. In this way, the private CA may verify the identity of the virtual network function more quickly and based on less information relative to a public CA that verifies the identity of an entity based on information included in the CSR, such as information identifying the entity, information identifying an entity associated with the network, and/or the like.

Further, by verifying the identity of the virtual network function based on determining that the virtual network function has been instantiated in the network, receiving the CSR from the life cycle manager, and/or the like, the private PKI may prevent a malicious actor from falsely obtaining a certificate by impersonating an identity of the virtual network function.

The private CA may store the certificate in a secure memory and may provide the certificate to the life cycle manager. Storing the certificate in a secure memory, rather than a public database associated with a public CA, may prevent a malicious actor from obtaining information identifying the virtual network function, information identifying a device on which the virtual network function is implemented, information identifying an entity associated with the network (e.g., an ISP), and/or the like that may be included in a certificate stored in a public database. In this way, the private CA may prevent the creation of a security risk associated with a malicious actor determining a topology of the network and/or other information about the network that the malicious actor may use to attack the network based on the information stored in the public database. By preventing the creation of the security risk, computing resources that otherwise may be utilized to identify the attack on the network, investigate suspicious activity associated with the attack, perform one or more actions to mitigate damage caused by the attack, and/or the like may be conserved.

FIGS. 1A-1I are diagrams of one or more example implementations 100 described herein. As shown in FIGS. 1A-1I, a network function orchestrator 101 is associated with a core network infrastructure. The network function orchestrator 101 may manage network resources to ensure that computing resources, storage resources, and/or the like are available to provide a network service. As shown in FIG. 1A, the network function orchestrator 101 may include a network function manager 102 and a certificate manager 103.

The network function manager 102 may manage a lifecycle of network functions included in the core network infrastructure. For example, the network function manager 102 may instantiate a network function, may scale network functions included in the core network infrastructure, may update a network function, may upgrade a network function, may terminate a network function, and/or the like.

The certificate manager 103 may manage a lifecycle of certificates obtained from a certificate authority (CA) 104 (or an intermediate certificate authority (ICA) 104, as shown in FIG. 1A) for network functions included in the core network infrastructure. For example, the certificate manager 103 may obtain a certificate for a newly instantiated network function, may validate a certificate based on a request form a network function, may determine that a certificate is expired, may renew a certificate, may terminate a certificate, and/or the like.

In some implementations, the CA 104 may be co-located with the certificate manager. For example, the CA 104 may be a component of the network function orchestrator 101.

In some implementations, the certificate manager 103 may include the CA 104. For example, the core network infrastructure may comprise a container infrastructure. The container infrastructure may be a containerized core network infrastructure that includes containerized network functions, such as a Kubernetes. The certificate manager 103 may comprise an infrastructure PKI service configured to perform the functions of the certificate manager 103 and the CA 104, as described herein.

In some implementations, the network function manager 102 instantiates a network function to facilitate communication via the network. For example, the network may be a service provider network. A user equipment (UE) 105 (shown in FIG. 1B) may be associated with a customer of the service provider. The UE 105 may access the service provider network via a radio access network to access a service provided by the service provider and/or subscribed to by the customer.

The network function manager 102 may determine that a quantity of communication sessions associated with the network satisfies a threshold quantity of communication sessions. As shown in FIG. 1A, and by reference number 110, the network function manager 102 instantiates a network function (e.g., NF-1, as shown in FIG. 1A) for a communication session with the UE 105. The network function manager 102 may instantiate the network function NF-1 to enable the UE 105 to access the service.

In some implementations, the network function NF-1 is a virtual network function. For example, the network function manager 102 may identify a physical device for hosting the virtual network function. The network function manager 102 may cause physical resources of the physical device to be allocated to the virtual network function. The network function manager 102 may deploy or instantiate the virtual network function based on allocating the physical resources.

In some implementations, the core network infrastructure is a containerized core network infrastructure and the network function NF-1 is a containerized network function. For example, the core network infrastructure may be a Kubernetes that groups containers associated with an application into a logical unit (e.g., as shown in FIG. 1A).

Figure 1C:
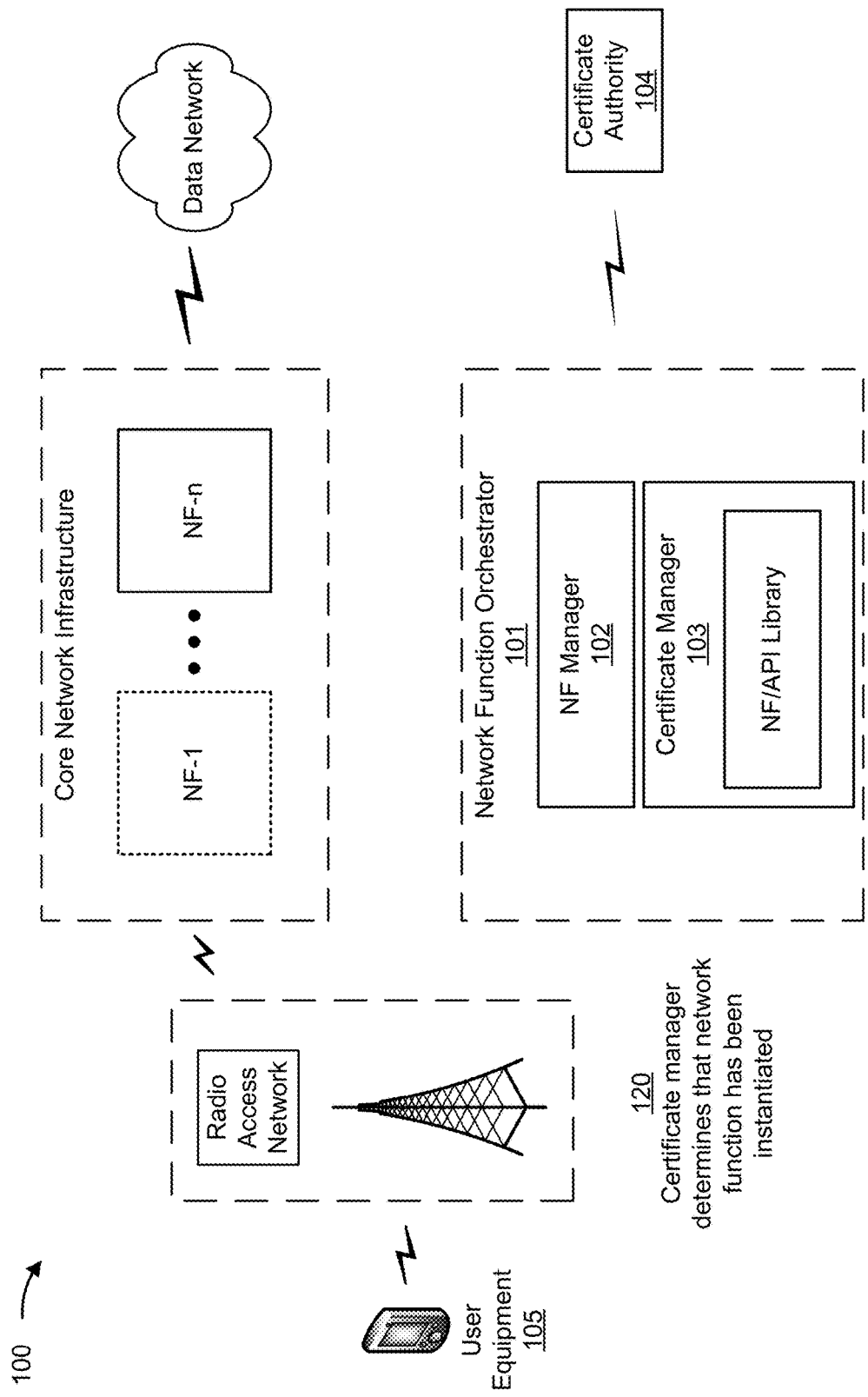

As shown in FIG. 1C, and by reference number 120, the certificate manager 103 determines that the network function NF-1 has been instantiated. In some implementations, the certificate manager 103 may determine that the network function NF-1 has been instantiated based on information provided by the network function orchestrator 101. For example, the network function manager 102 may provide a notification to the certificate manager 103 based on instantiating the network function NF-1. The notification may include an identifier associated with the network function NF-1 and information identifying an IP address associated with the network function NF-1. Additionally, the notification may include information identifying a communication protocol utilized by the network function NF-1, information indicating that the network function NF-1 has been instantiated, information identifying a host associated with the network function NF-1 (e.g., a host name, an identifier, and/or another type of information identifying a physical device on which the virtual function has been instantiated or deployed), and/or the like.

Alternatively, and/or additionally, the certificate manager 103 may determine that the network function NF-1 has been instantiated based on information provided by the network function NF-1. For example, the network function NF-1 may generate a request for a certificate. The request may include information identifying an IP address associated with the network function NF-1, information identifying a host associated with the network function NF-1, and/or the like.

In some implementations, the request includes a public key and/or the private key. For example, the network function NF-1 may generate and/or obtain a key pair that includes a public key and a private key associated with the network function NF-1. The network function NF-1 may include information identifying the public key and/or the private key in the request.

The network function NF-1 may transmit the request to the certificate manager 103. The certificate manager 103 may determine that the network function NF-1 has been initiated based on receiving the request. When the request includes the private key, the certificate manager 103 may extract the private key from the request and may store the private key in a secure vault or a secure memory associated with the certificate manager. In this way, the private key is maintained within the network. By maintaining the private key within the network, the certificate manager 103 may reduce a risk that the private key is compromised.

The certificate manager 103 may determine to obtain a certificate for the network function NF-1 based on the network function NF-1 being instantiated. For example, the certificate manager 103 may determine an identifier associated with the network function NF-1 based on the notification. The certificate manager 103 may determine a type of the network function NF-1, an operation to be performed by the network function NF-1, a communication protocol associated with the network function NF-1, and/or the like based on the identifier. For example, the certificate manager 103 may access a data structure (e.g., a database, a list, and/or the like) stored in a memory associated with the certificate manager 103. The data structure may store information associating identifiers with types of network functions, information associating types of network functions with operations performed by the types of network functions, communication protocols associated with the types of network functions, application program interfaces associated with the types of network functions, and/or the like.

For example, the set of network rules may indicate that the containerized network function is to utilize a particular communication protocol to communicate with another containerized network function. The certificate manager 103 may determine that the other containerized network function authenticates and/or verifies the identity of the containerized network function based on a certificate when communicating with the containerized network function based on the communication protocol.

The certificate manager 103 may determine to obtain a certificate for the network function NF-1 based on the type of the network function NF-1, the operation to be performed by the network function NF-1, the communication protocol associated with the network function NF-1, and/or the like. For example, the certificate manager 103 may determine that the network function NF-1 needs to communicate with one or more other network functions included in the core network infrastructure based on the network function NF-1 being a particular type of network function, based on the network function NF-1 being configured to perform a particular operation, and/or the like.

Alternatively, and/or additionally, the certificate manager 103 may determine that a communication protocol associated with the network function NF-1 is not a communication protocol for communicating with the CA 104. The certificate manager 103 may determine to obtain the certificate for the network function NF-1 based on the communication protocol associated with the network function NF-1 not being a communication protocol for communicating with the CA 104.

In some implementations, the certificate manager 103 may determine to obtain a certificate for the network function FN-1 based on a proxy associated with the network function FN-1. For example, the network function FN-1 may be a containerized network function that is associated with a proxy. The proxy may implement a set of network rules for a group of containerized network functions. The network rules enable the group of containerized network functions to communicate with containerized network functions included in the group of containerized network functions and/or with containerized network functions not included in the group of containerized network functions. The certificate manager 103 may determine the set of network rules associated with the proxy associated with the containerized network function and may determine to obtain a certificate for the containerized network function based on the set of network rules.

Figure 1D:
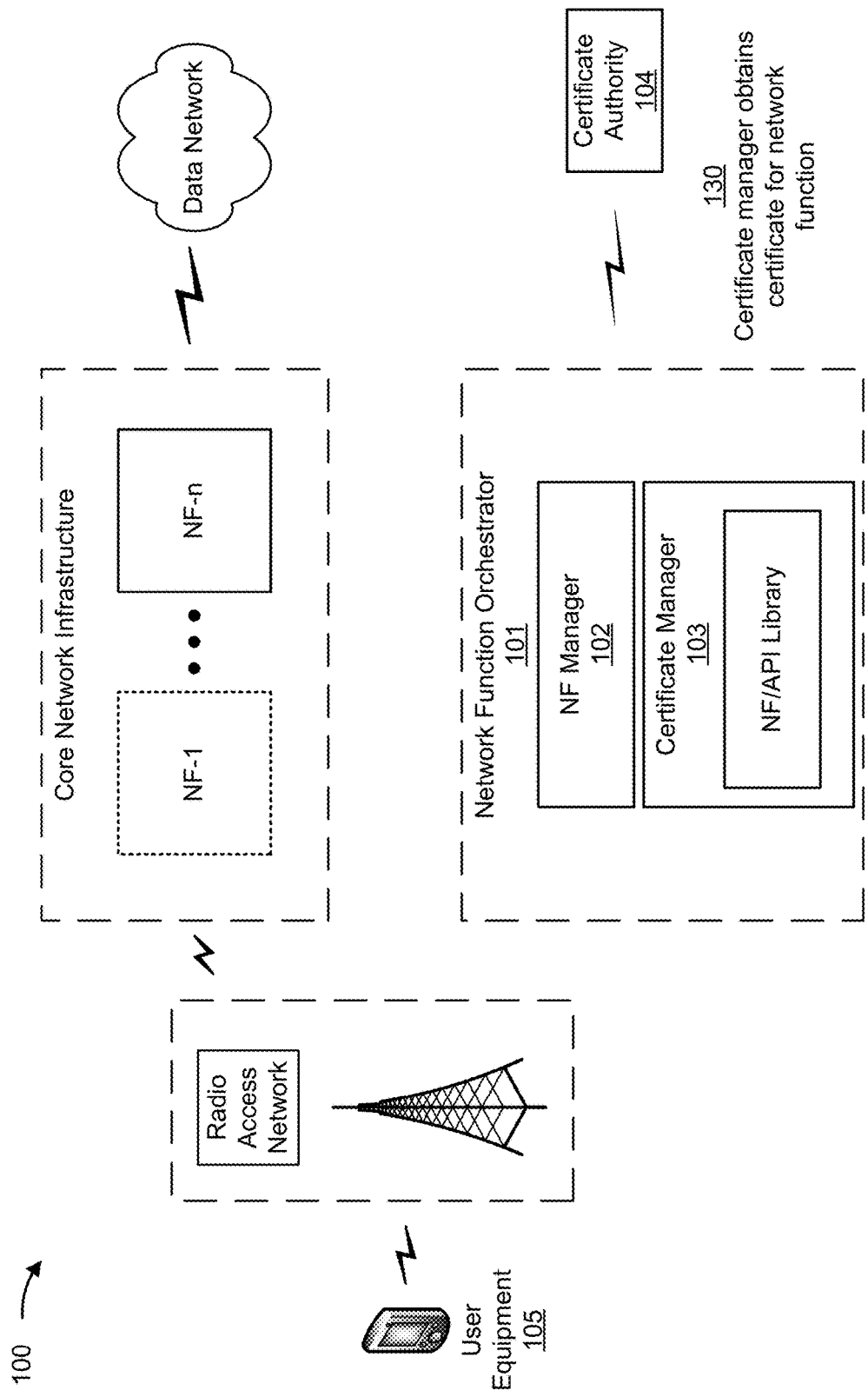

As shown in FIG. 1D, and by reference number 130, the certificate manager 103 obtains a certificate for the network function NF-1. For example, the certificate manager 103 may generate and/or transmit a request for a certificate to the CA 104 to obtain a certificate for the network function NF-1. The request may include information identifying the network function NF-1, a public key, information identifying the certificate manager 103, information identifying an application program interface associated with the network function NF-1, information identifying a proxy associated with the network function NF-1, information identifying a communication protocol associated with the network function NF-1, and/or the like.

In some implementations, a public key generated by the network function NF-1 is included in the request. In some implementations, a public key generated by the certificate manager 103 is included in the request. For example, the certificate manager 103 may generate a key pair that includes a private key and a public key based on determining that the network function NF-1 is instantiated, based on determining to obtain the certificate, based on a communication protocol associated with the network function NF-1, and/or the like. The certificate manager 103 may include the public key in the request and may store the private key in a secure vault or a secure memory associated with the certificate manager. In this way, the private key is maintained within the network thereby reducing a risk of the public key being compromised.

In some implementations, the request does not include a public key. For example, the CA 104 may generate the public key and/or the private key, the network function NF-1 may utilize another form of encryption to transmit data, and/or the like.

The CA 104 may receive the request and may verify an identity of the network function NF-1. For example, the CA 104 may determine that the network function NF-1 and/or the certificate manager 103 are included in a network associated with a service provider associated with the CA 104. In some implementations, the CA 104, the network function NF-1, and/or the certificate manager 103 may be associated with a same host platform. The CA 104 may determine that the network function NF-1 and/or the certificate manager 103 are included in the network associated with the service provider based on the CA 104, the network function NF-1, and/or the certificate manager 103 being associated with the same host platform.

The CA 104 may verify the identity of the network function NF-1 based on the network function NF-1 and/or the certificate manager 103 being included in the network associated with the service provider. In this way, the CA 104 may quickly and efficiently verify the identity of the network function NF-1.

In some implementations, the CA 104 verifies the identity of the network function NF-1 based on the request being signed by the certificate manager 103. The request may include a digital signature. The certificate manager 103 may encrypt the digital signature utilizing a private key associated with the certificate manager 103. The CA 104 may obtain a public key associated with the certificate manager 103 (e.g., from a memory associated with the CA 104) and may utilize the public key to decrypt the encrypted digital signature. The CA 104 may verify that the request was sent by the certificate manager 103 based on decrypting the digital signature with the public key associated with the certificate manager 103. The CA 104 may verify the identity of the network function NF-1 based on verifying that the request was sent by the certificate manager 103.

In some implementations, the request may by signed by an entity associated with the network (e.g., a vendor, a service provider, and/or the like). The CA 104 may receive the request during a bootstrap process and may verify the identity of the network function NF-1 based on the request being signed by the entity.

The CA 104 may generate a certificate for the network function NF-1 based on verifying the identity of the network function NF-1. The certificate may uniquely identify the network function NF-1 and may enable other network functions to verify the identity of the network function NF-1. By using the certificate to verify the identity of the network function NF-1, the certificate may enable network functions to enforce access control by ensuring that a malicious actor is not attempting to access the network.

In some implementations, the certificate is an X 509 certificate that includes a unique identifier associated with the network function NF-1, information identifying a host device associated with the network function NF-1, information identifying an entity that has signed the certificated, information identifying an entity that has issued the certificate, and/or the like.

In some implementations, the CA 104 may generate the certificate based on an available key configuration and/or a certification protocol associated with the CA 104. For example, the request may include information identifying a proxy associated with the network function NF-1, information identifying a communication protocol associated with the network function NF-1, information identifying a type of network function associated with the network function NF-1, and/or the like. The CA 104 may determine a certification protocol based on the information included in the request. The CA 104 may determine that the certification protocol is associated with a key (e.g., a private key, a public key, and/or the like) and/or a particular key configuration. The CA 104 may identify, from a key data structure stored in a memory associated with the CA 104, an available key configuration for the certificate based on the certification protocol being associated with the key and/or the particular key configuration. The CA 104 may generate the certificate based on the available key configuration and based on the certification protocol.

The certificate may include information identifying the CA 104, information identifying the network function NF-1, the public key, information identifying an application interface associated with the network function NF-1, information identifying a communication protocol associated with the CA 104 (e.g., certificate management protocol, version 2 (CMPv2), simple certificate enrollment protocol (SCEP), enrollment over secure transport (EST), and/or the like), and/or the like. The CA 104 may store the certificate in a data structure stored in a memory of the CA 104 and/or may transmit the certificate to the certificate manager 103.

Figure 1E:
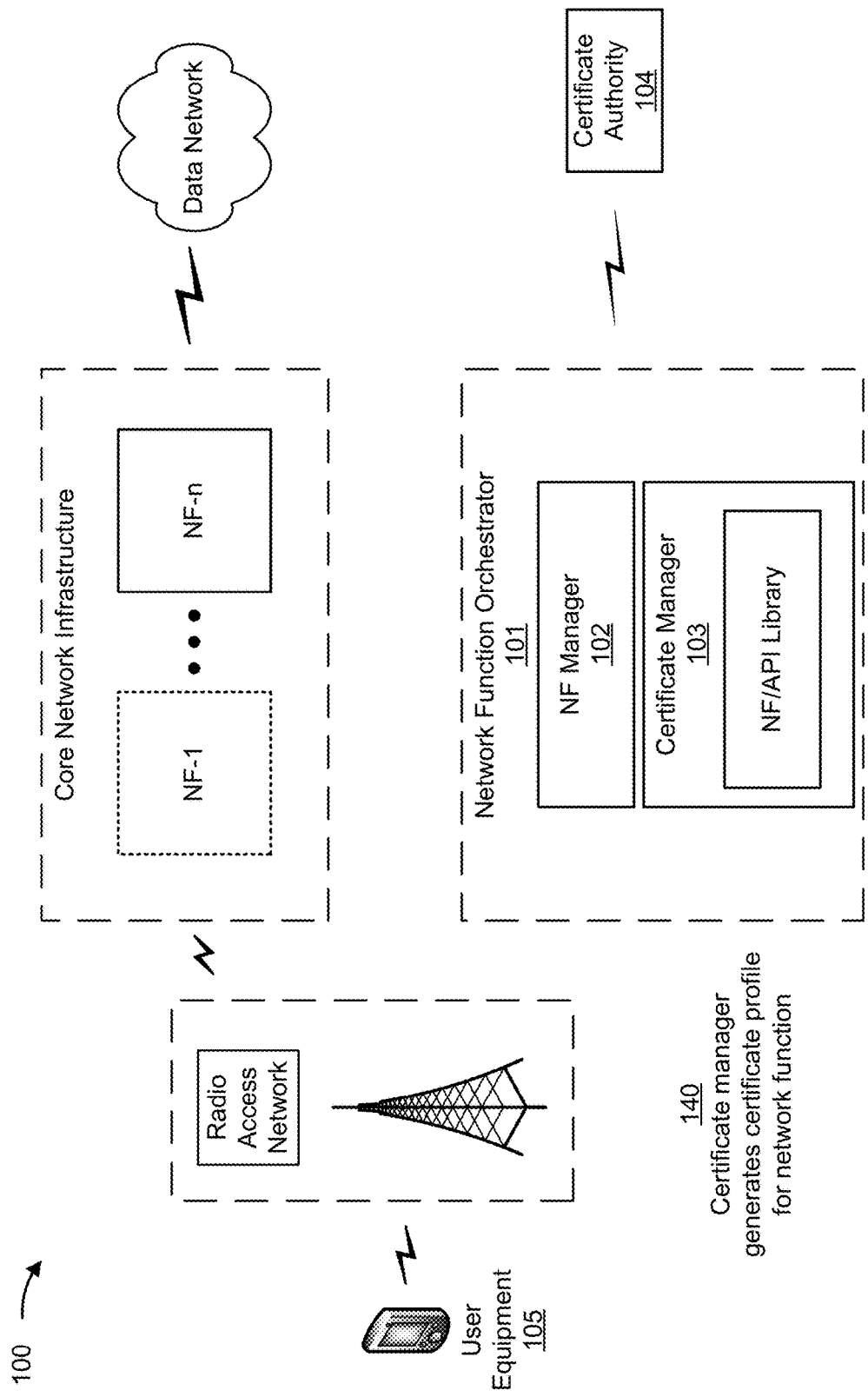

The certificate manager 103 may receive the certificate from the CA 104 and may store the certificate in a memory (e.g., secure storage) associated with the certificate manager 103. As shown in FIG. 1E, and by reference number 140, the certificate manager generates a certificate profile for the network function NF-1. The certificate profile may include the certificate, the private key (e.g., when the key pair including the private key and the public key is generated by the certificate manager 103 and/or the CA 104), information identifying the certification protocol associated with the CA 104, information identifying the certificate authority (e.g., CA 104), information identifying the application program interface associated with the network function NF-1, information identifying the certificate manager 103, information identifying an IP address associated with the network function NF-1, and/or the like.

Figure 1F:
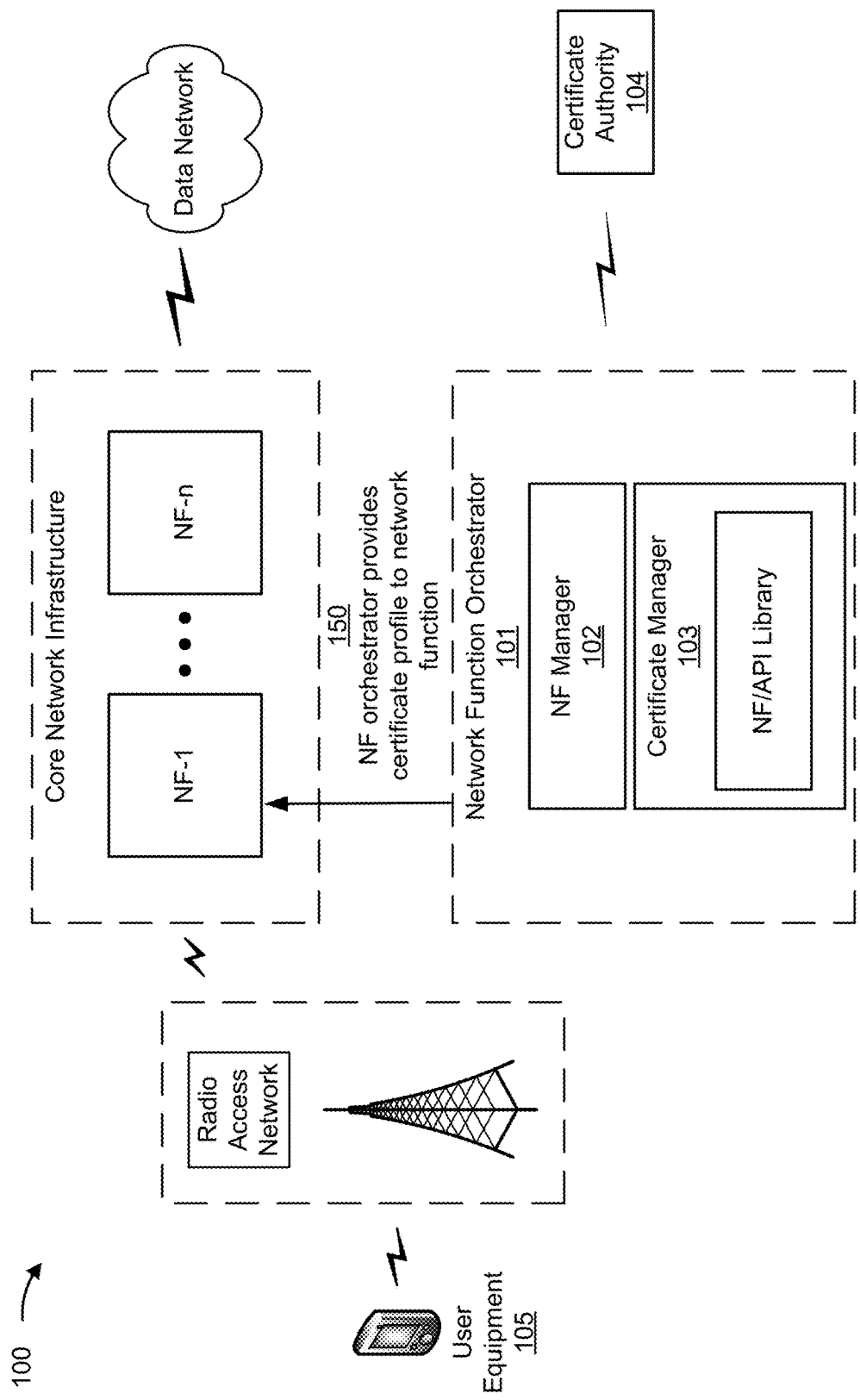

As shown in FIG. 1F, and by reference number 150, the network function orchestrator 101 provides the certificate profile to the network function NF-1. For example, the certificate manager 103 may transmit the certificate profile to the network function NF-1 to enable the network function NF-1 to communicate in a secure manner (e.g., via encrypted data, via a secure communication session, and/or the like) with other network functions included in the core network infrastructure.

Figure 1G:
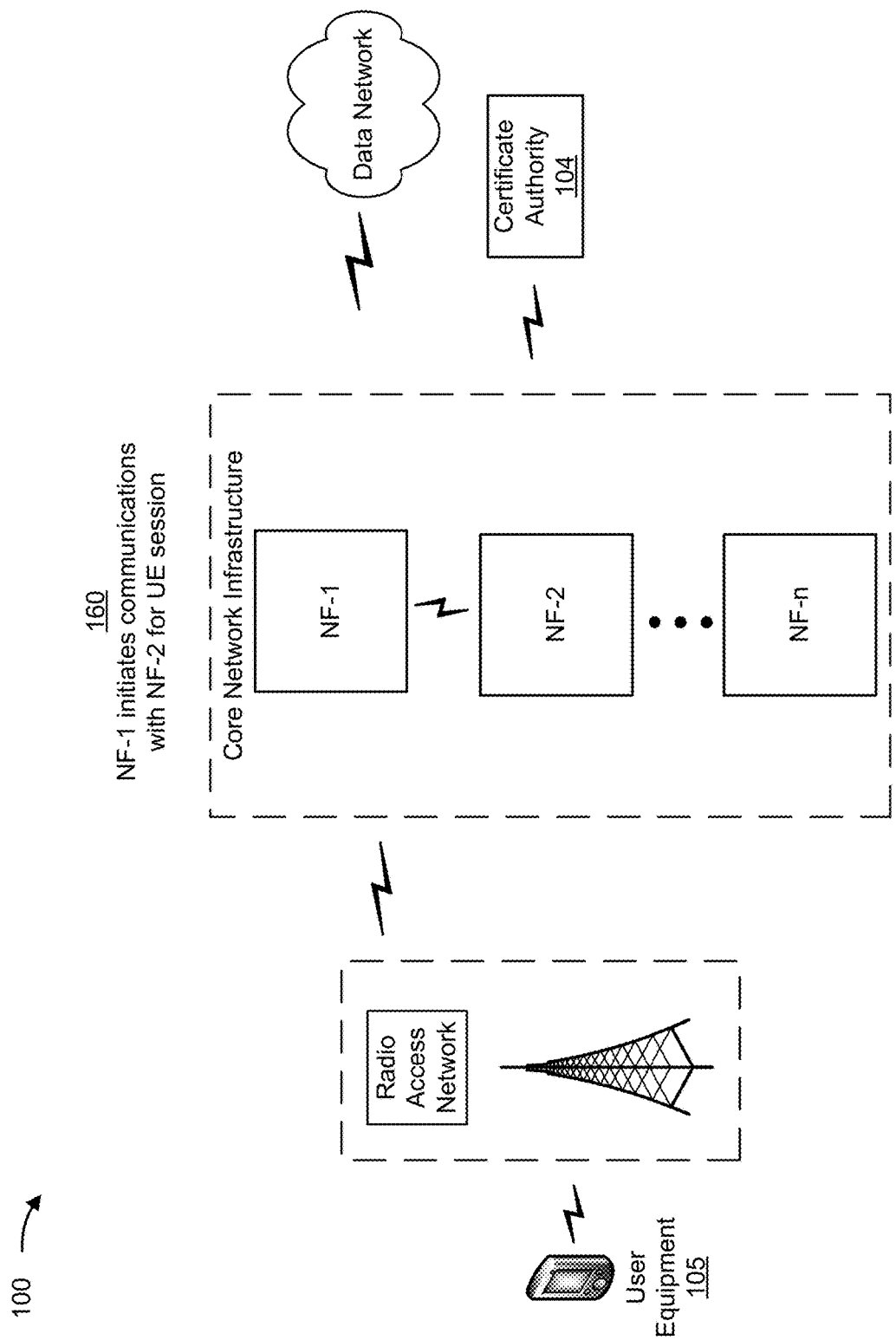

As shown in FIG. 1G, and by reference number 160, the network function NF-1 initiates communications with another network function (e.g., NF-2 as shown in FIG. 1G). For example, the network function NF-1 may determine to establish a communication session with the network function NF-2 to allow the UE 105 to access a service provided by the network. The network function NF-1 may transmit a request to establish the communication session with the network function NF-2. The request may include the certificate included in the certificate profile, a digital signature associated with the network function NF-1, and/or the like.

Figure 1H:
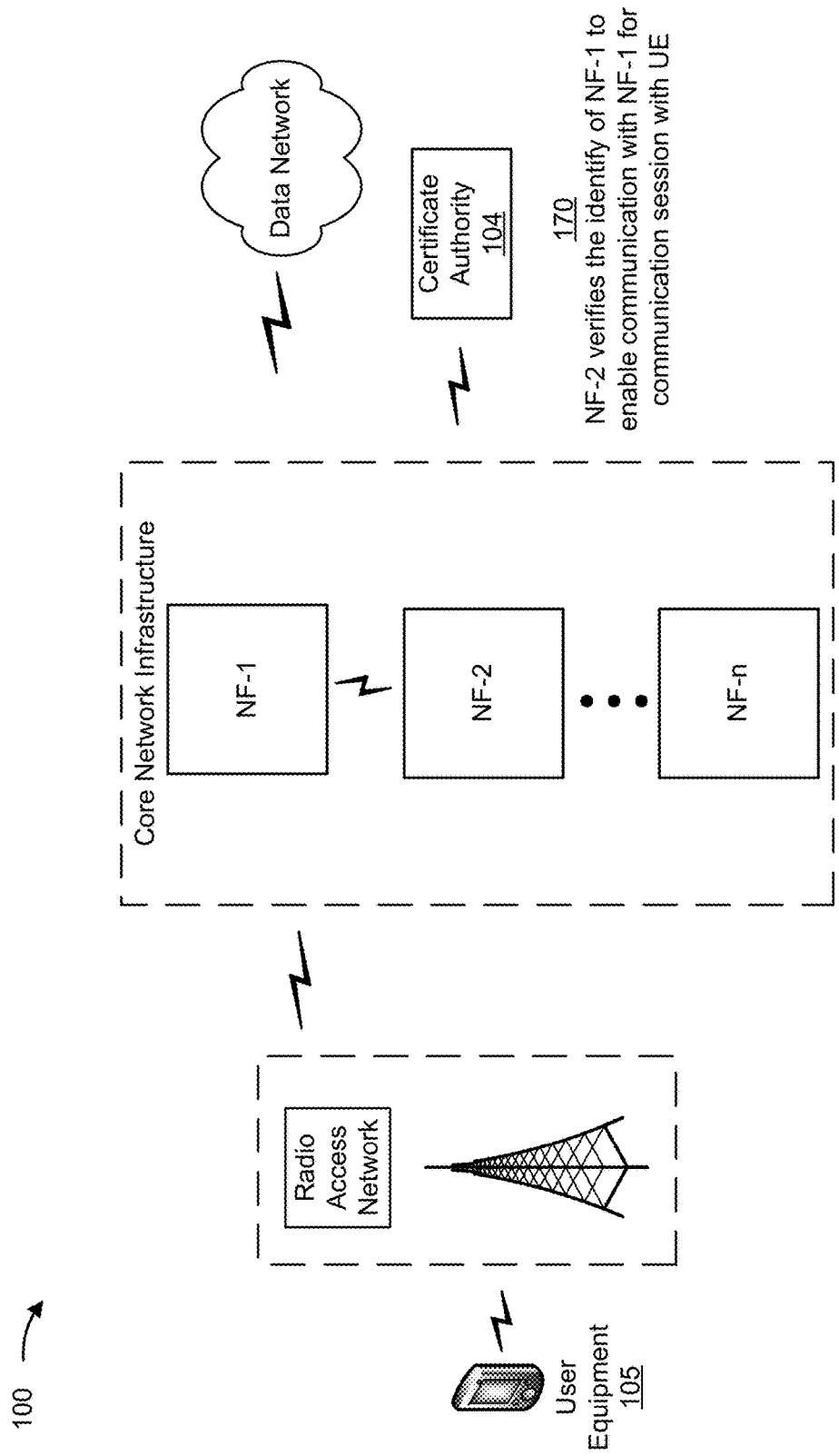

The other network function NF-2 may receive the request and may verify the identity of the network function NF-1 (e.g., verify that the request was transmitted by the network function NF-1) and/or authenticate the network function NF-1 based on the certificate. As shown in FIG. 1H, and by reference number 170, the other network function NF-2 verifies the identity of the network function NF-1 to enable communication with the network function NF-1 for the communication session with the UE 105. For example, the other network function NF-2 may transmit a request for the public key associated with the network function NF-1 to the CA 104. The request may include information identifying the certificate issued to the network function NF-1, information identifying the network function NF-1, and/or the like.

The CA 104 may receive the request and may determine whether the certificate issued for the network function NF-1 has been revoked based on a certificate revocation list (CRL) stored in a memory of the CA 104. The CRL may store information identifying certificates that have been revoked. The CA 104 may determine that the CRL does not include information identifying the certificate issued to the network function NF-1. The CA 104 may determine that the certificate is valid (e.g., active, not revoked, and/or the like) based on the CRL not including information identifying the certificate. The CA 104 may obtain the public key associated with the network function NF-1 and may transmit the public key and/or information indicating that the certificate is valid to the other network function NF-2 based on the certificate being valid.

The other network function NF-2 may verify the identity of the network function NF-1 based on the public key and/or the information indicating that the certificate is valid. For example, the network function NF-1 may encrypt the digital signature included in the request transmitted to the other network function NF-2 based on the private key associated with the network function NF-1. The other network function NF-2 may decrypt the digital signature based on the public key associated with the network function NF-1. The other network function NF-2 may verify the identity of the network function NF-1 based on decrypting the digital signature based on the public key associated with the network function NF-1.

In some implementations, the other network function NF-2 transmits a response to the network function NF-1 based on verifying the identity of the network function NF-1. The response may include information indicating that the other network function NF-2 verified the identify of the network function NF-1 and/or a certificate issued to the other network function NF-2. The network function NF-1 may receive the response and may verify the identity of the other network function NF-2 based on the certificate included in the response. In some implementations, the network function NF-1 verifies the identity of the other network function NF-2 in a manner similar to that described above with respect to FIG. 1H.

Figure 1I:
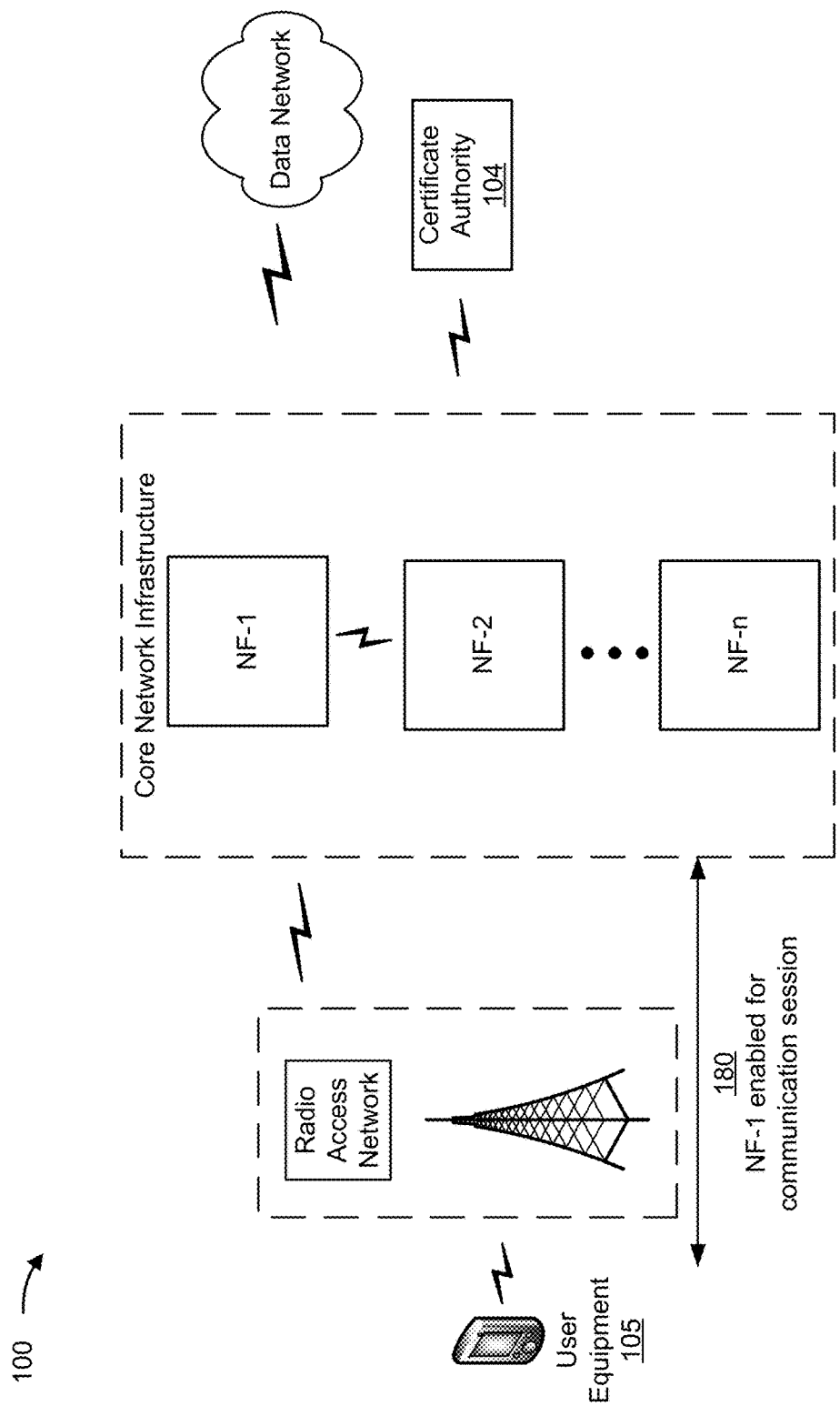

The network function NF-1 may establish the communication session with the UE 105 and/or the other network function NF-2 to provide the service to the UE 105 based on receiving the response and/or verifying the identity of the other network function NF-2. As shown in FIG. 1I, and by reference number 180, the network function NF-1 is enabled for the communication session with the UE 105 based on establishing the communication session with the other network function NF-2.

By utilizing a private PKI to verify an identity of an entity in a network, a network architecture of the network can be quickly and efficiently modified to adapt to a current network condition (e.g., a request from a UE to access a service provided by the network, network congestion, a failure of a network function, a failure of a host device, and/or the like). Further, because the certificates are not stored in a public database, a risk of creating a security vulnerability associated with the network may be decreased, as discussed above.

As indicated above, FIGS. 1A-1I are provided as one or more examples. Other examples may differ from what is described with regard to FIGS. 1A-1I. The number and arrangement of devices shown in FIGS. 1A-1I are provided as an example. In practice, there may be additional devices, fewer devices, different devices, or differently arranged than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
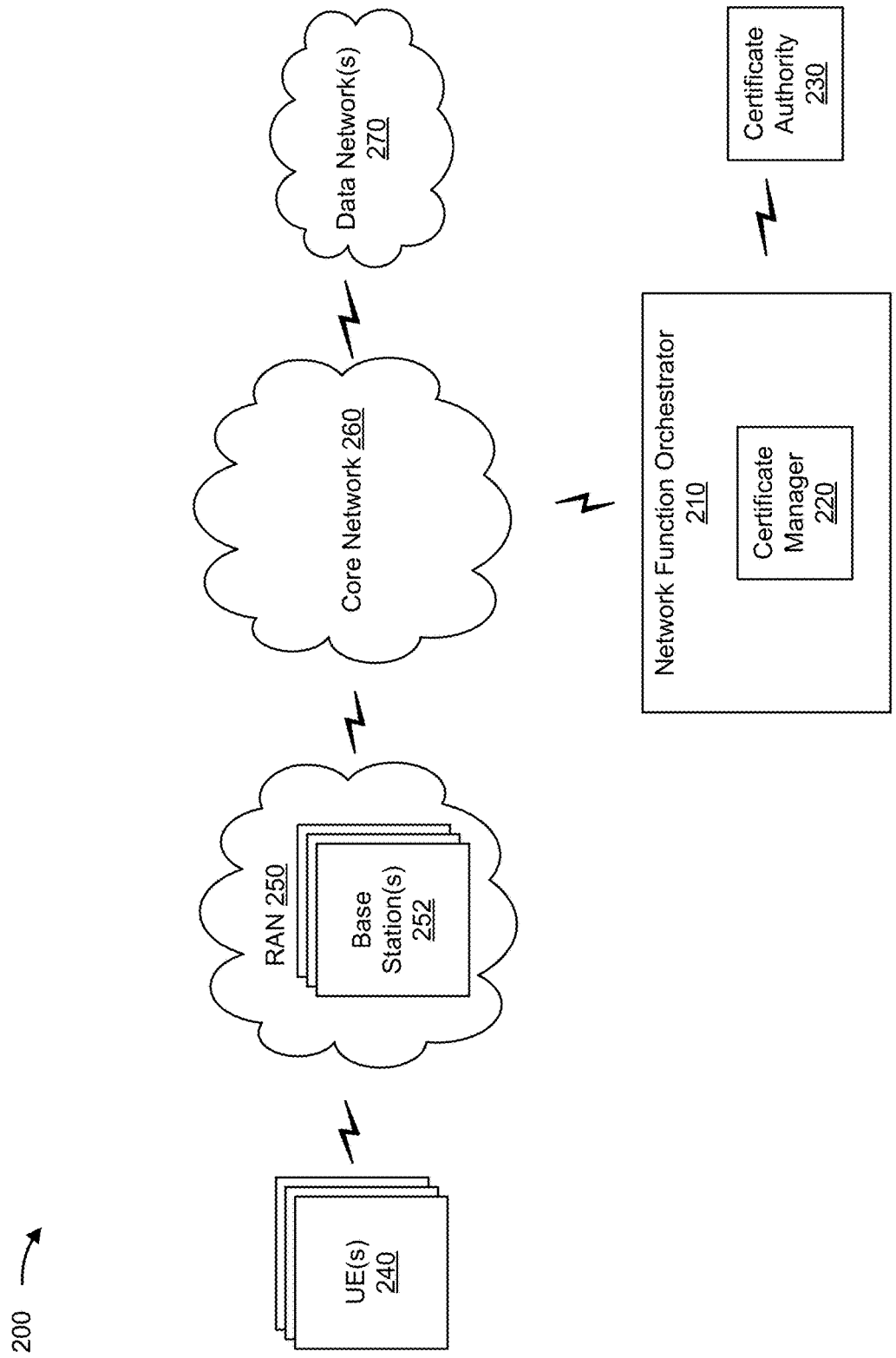
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a network function orchestrator 210, a certificate manager 220, a CA 230, one or more UE(s) 240 (referred to herein individually as UE 240 or collectively as UEs 240), a RAN 250, one or more base stations 252 (referred to herein individually as base station 252 or collectively as base stations 252), a core network 260, and a data network 270. Devices of environment 200 may interconnect via wired connections, wireless connections, or a combination of wired and wireless connections.

Network function orchestrator 210 includes one or more devices, components, or functions (implemented on one or more devices) to perform one or more functions described herein. Network function orchestrator 210 may instantiate network functions, terminate network functions, scale network functions to enable UE 240 to utilize one or more services provided by core network 260. In some implementations, network function orchestrator 210 corresponds to network function orchestrator 101 of FIGS. 1A-1H.

Certificate manager 220 includes one or more devices for provisioning, managing, and/or providing certificates to entities included in core network 260. Certificate manager 220 may determine that a network function has been instantiated in core network 260, may obtain a certificate for the network function, and may provide the certificate to the network function to enable the network function to communicate with other network functions within core network 260. In some implementations, certificate manager 220 corresponds to certificate manager 103 of FIGS. 1A-1H.

Certificate authority 230 includes one or more devices, components, or functions (implemented on one or more devices) to generate and provide certificates, as described herein. For example, certificate authority 230 may receive a request for a certificate, verify an identity of an entity for which the certificate is to be generated, and generate the certificate based on verifying the identity of the entity. In some implementations, certificate authority 230 corresponds to certificate authority 104 of FIGS. 1A-1H.

UE 240 includes one or more devices capable of communicating with base station 252 and/or a network (e.g., core network 260, data network 270, and/or the like). For example, UE 240 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. UE 240 may be capable of communicating using uplink (e.g., UE to base station) communications, downlink (e.g., base station to UE) communications, and/or side link (e.g., UE-to-UE) communications. In some implementations, UE 240 may include a machine-type communication (MTC) UE, such as an evolved or enhanced MTC (eMTC) UE. In some implementations, UE 240 may include an IoT UE, such as a narrowband IoT (NB-IoT) UE and/or the like. In some implementations, UE 240 may perform one or more actions described as being performed by the UE of example implementation 100. In some implementations, UE 240 corresponds to UE 105 of FIGS. 1A-1H.

RAN 250 can include a base station and be operatively connected, via a wired and/or wireless connection, to the core network 260 through a user plane function (UPF). RAN 250 can facilitate communication sessions between UEs 240 and data network 270 by communicating application-specific data between RAN 250 and core network 260.

Base station 252 includes one or more devices capable of communicating with UE 240 using a cellular Radio Access Technology (RAT). For example, base station 252 may include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 252 may transfer traffic between UE 240 (e.g., using a cellular RAT), other base stations 252 (e.g., using a wireless interface or a backhaul interface, such as a wired backhaul interface), and/or data network 270. Base station 252 may provide one or more cells that cover geographic areas. Some base stations 252 may be mobile base stations. Some base stations 252 may be capable of communicating using multiple RATs.

In some implementations, base station 252 may perform scheduling and/or resource management for UEs 240 covered by base station 252 (e.g., UEs 240 covered by a cell provided by base station 252). In some implementations, base station 252 may be controlled or coordinated by a network controller, which may perform load balancing, network-level configuration, and/or the like. The network controller may communicate with base station 252 via a wireless or wireline backhaul. In some implementations, base station 252 may include a network controller, a self-organizing network (SON) module or component, or a similar module or component. In other words, base station 252 may perform network control, scheduling, and/or network management functions (e.g., for other base stations 252 and/or for uplink, downlink, and/or side link communications of UEs 240 covered by the base station 252). In some implementations, base station 252 may include a central unit and multiple distributed units. The central unit may coordinate access control and communication with regard to the multiple distributed units. The multiple distributed units may provide UEs 240 and/or other base stations 252 with access to data network 270.

Core network 260 includes various types of core network architectures, such as a 5GC (e.g., core network 300 of FIG. 3), an LTE evolved packet core (EPC), and/or the like. In some implementations, core network 260 may be implemented on physical devices, such as gateways, mobility management entities, and/or the like. In some implementations, the hardware and/or software implementing core network 260 can be virtualized (e.g., through the use of network function virtualization and/or software-defined networking), thereby allowing for the use of composable infrastructure when implementing core network 260. In this way, networking, storage, and compute resources can be allocated to implement the functions of core network 260 in a flexible manner as opposed to relying on dedicated hardware and software to implement these functions. Core network 260 may be managed by network function orchestrator 210.

Data network 270 includes one or more wired and/or wireless data networks. For example, data network 270 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
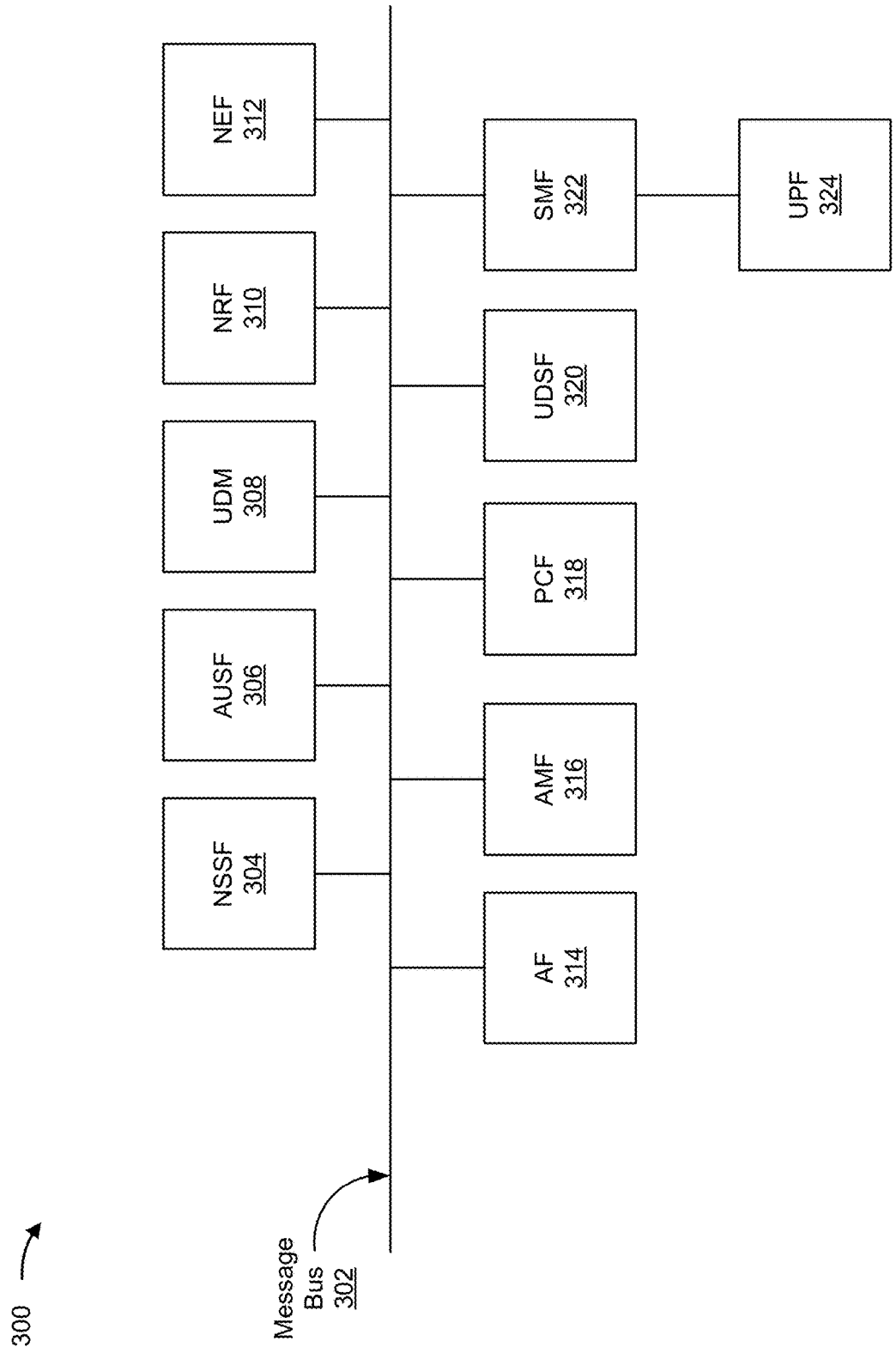
FIG. 3 is a diagram of an example functional architecture of a core network in which systems and/or methods, described herein, can be implemented.

FIG. 3 is a diagram of an example functional architecture of a core network 300 in which systems and/or methods, described herein, can be implemented. As shown in FIG. 3, core network 300 may include a number (or quantity) of functional elements. The functional elements of core network 300 may communicate via a message bus 302. As shown in FIG. 3, the functional elements may include, for example, a network slice selection function (NSSF)) 304, an authentication server function (AUSF) 306, a unified data management (UDM) function 308, a network function repository function (NRF) 310, a network exposure function (NEF) 312, an application function (AF) 314, an access and mobility management function (AMF) 316, a policy control function (PCF) 318, an unstructured data storage function (UDSF) 320, a session management function (SMF) 322, a user plane function (UPF) 324, and/or the like. As shown, these functional elements may be communicatively connected via message bus 302.

Each of the functional elements shown in FIG. 3 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 304 is a hardware-based element that may select network slice instances (NSIs) for UEs (and/or may determine network slice policies to be applied at a RAN). By providing network slicing, NSSF 304 allows an operator to deploy multiple substantially independent end-to-end networks potentially with the same infrastructure. In some implementations, each slice may be customized for different services.

AUSF 306 is a hardware-based element that may act as an authentication server and support the process of authenticating UEs in the wireless telecommunications system. UDM 308 can store subscriber data and profiles in the wireless telecommunications system. UDM 308 can be used for fixed access, mobile access, and/or the like, in core network 300.

NRF 310 is a hardware-based element that may interface with NEF 312 to provide AMF 316 with group messages. NRF 310 may enable the functional elements of core network 300 to discover and communicate with one another via message bus 302. NEF 312 is a hardware-based element that may support the exposure of capabilities and/or events in the wireless telecommunications system to help other entities in the wireless telecommunications system discover network services. For example, NEF 312 may support the exposure of group messages that may be provided via a group messaging service.

AF 314 may be a hardware-based element that may support application influence on traffic routing, access to NEF 312, policy control, and/or the like. In some implementations, AMF 316 may be a hardware-based element that may act as a termination point for Non-Access Stratum (NAS) signaling, mobility management, and/or the like. AMF 316 can provide authentication and authorization of UEs and mobility management (e.g., provisioning UEs to use NSIs associated with SDDs as described herein). PCF 318 can provide a policy framework that incorporates network slicing, roaming, packet processing, mobility management, and/or the like.

UDSF 320 includes one or more data structures configured to store information, mappings, and/or the like associated with the core network 300. For example, UDSF 320 may include one or more tables, mappings, graphs, and/or the like of resources, NSIs, slice deployment descriptions (SDDs), and/or the like.

SMF 322 may be a hardware-based element that may support the establishment, modification, and release of communication sessions in the wireless telecommunications system. For example, SMF 322 may configure traffic steering policies at UPF 324, enforce UE IP address allocation and policies, and/or the like. SMF 322 can support the establishment, modification, and release of communication sessions in the wireless telecommunications system. For example, SMF 322 can configure traffic steering policies at UPF 324, enforce UE IP address allocation and policies, and/or the like. AMF 316 and SMF 322 can act as a termination point for Non-Access Stratum (NAS) signaling, mobility management, and/or the like. SMF 322 can act as a termination point for session management related to NAS. RAN 250 can send information (e.g., the information that identifies the UE) to AMF 316 and/or SMF 322 via PCF 318.

UPF 324 is a hardware-based element that may serve as an anchor point for intra/inter-RAT mobility. UPF 324 may apply rules to packets, such as rules pertaining to packet routing, traffic reporting, handling user plane QoS, and/or the like. Message bus 302 represents a communication structure for communication among the functional elements. In other words, message bus 302 may permit communication between two or more functional elements of core network 300.

The number and arrangement of functional elements shown in FIG. 3 are provided as an example. In practice, there may be additional functional elements, fewer functional elements, different functional elements, or differently arranged functional elements than those shown in FIG. 3. Furthermore, two or more functional elements shown in FIG. 3 may be implemented within a single device, or a single functional element shown in FIG. 3 may be implemented as multiple, distributed devices. Additionally, or alternatively, a set of functional elements (e.g., one or more functional elements) of core network 300 may perform one or more functions described as being performed by another set of functional elements of core network 300.

Figure 4:
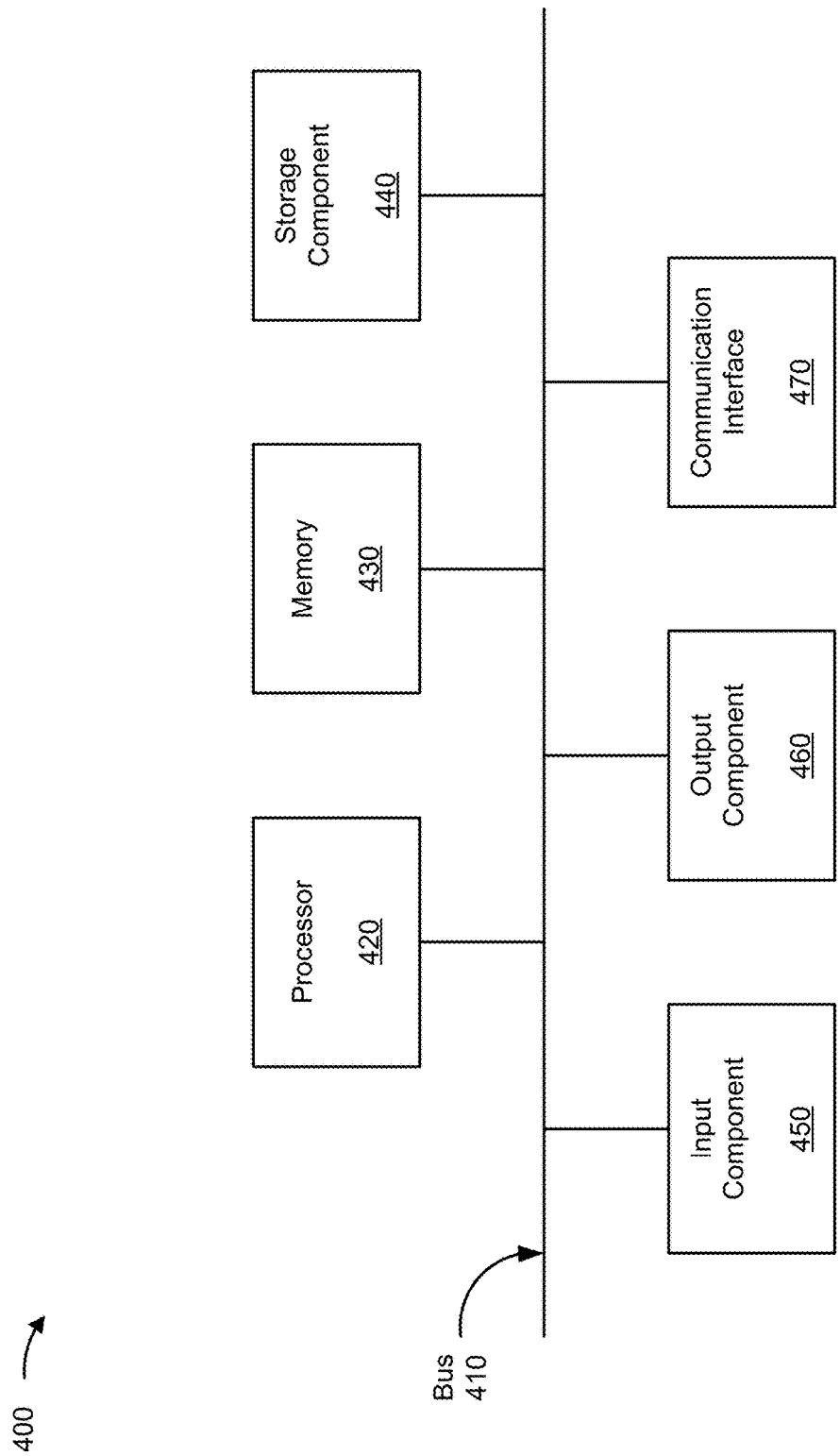
FIG. 4 is a diagram of example components of one or more devices of FIGS. 2 and 3.

FIG. 4 is a diagram of example components of a device 400. Device 400 may correspond to network function orchestrator 210, certificate manager 220, certificate authority 230, UE 240, base station 252, NSSF 304, AUSF 306, UDM 308, NRF 310, NEF 312, AF 314, AMF 316, PCF 318, UDSF 320, SMF 322, and/or UPF 324. In some implementations, network function orchestrator 210, certificate manager 220, certificate authority 230, UE 240, base station 252, NSSF 304, AUSF 306, UDM 308, NRF 310, NEF 312, AF 314, AMF 316, PCF 318, UDSF 320, SMF 322, and/or UPF 324 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 associated with systems and methods for managing public key infrastructure certificates for components of a network. In some implementations, one or more process blocks of FIG. 5 may be performed by a device (e.g., certificate manager 220). In some implementations, one or more process blocks of FIG. 5 may be performed by another device or a group of devices separate from or including the device, such as a network function orchestrator (e.g., network function orchestrator 210), a certificate authority (e.g., certificate authority 230), and/or the like. Additionally, or alternatively, one or more process blocks of FIG. 5 may be performed by one or more components of a device 400, such as processor 420, memory 430, storage component 440, input component 450, output component 460, communication interface 470, and/or the like.

As shown in FIG. 5, process 500 may include determining that a network function of a network has been instantiated to facilitate communication via the network (block 510). For example, the device may determine that a network function of a network has been instantiated to facilitate communication via the network, as described above.

Determining that the network function has been instantiated may include receiving, from a network function orchestrator of the network, a notification that the network function was instantiated, and determining, based on the notification, an identifier of the network function and a communication protocol of the network function, the certificate authority is requested to generate the certificate based on the identifier and the communication protocol.

The network function may comprise a virtual network function of a core network of the network. Alternatively, and/or additionally, the core network infrastructure may include a containerized core network infrastructure and the network function may include a containerized network function that is associated with a proxy of the containerized core network infrastructure. The certificate may be associated with the proxy.

As further shown in FIG. 5, process 500 may include requesting a certificate authority to provide a certificate for the network function (block 520). For example, the device may request a certificate authority to provide a certificate for the network function, as described above.

Requesting the certificate authority to provide the certificate may include generating a request for the certificate, the request identifies an application programming interface of the network function, and sending the request to the certificate authority, the certificate authority is configured to generate the certificate based on the application programming interface.

In some implementations, the network function may be a containerized network function and process 500 includes identifying a proxy associated with the containerized network function; determining the certification protocol based on the proxy; and generating the certificate based on the certification protocol.

In some implementations, process 500 includes identifying a type of the containerized network function; determining the certification protocol based on the type of the containerized network function; and generating the certificate based on the certification protocol.

The certification protocol may be associated with a dedicated certificate authority that is associated with a manager of a containerized core network infrastructure that includes the containerized network function.

As further shown in FIG. 5, process 500 may include receiving, from the certificate authority, the certificate (block 530). For example, the device may receive, from the certificate authority, the certificate, as described above.

As further shown in FIG. 5, process 500 may include generating a certificate profile to enable other network functions of the network to authenticate communications with the network function (block 540). For example, the device may generate a certificate profile to enable other network functions of the network to authenticate communications with the network function, as described above. In some implementations, the certificate profile identifies the certificate and a certification protocol.

The certification protocol may identify the certificate authority and may comprise at least one of a certificate management protocol, a simple certificate enrollment protocol, or an enrollment over secure transport protocol.

The certificate authority may be associated with a containerized core network infrastructure.

As further shown in FIG. 5, process 500 may include providing, to the network function, the certificate profile to cause the network function to use the certificate to communicate with the other network functions (block 550). For example, the device may provide, to the network function, the certificate profile to cause the network function to use the certificate to communicate with the other network functions, as described above.

In some implementations, the other network functions are configured to authenticate the communications with the network function based on the other network functions providing the certificate to the certificate authority in association with the certification protocol.

In some implementations, the network function may be a containerized network function and the other network functions are configured to authenticate communications within a containerized core network infrastructure based on the certification protocol, the certificate of the containerized network function, and individual certificates of the other network functions.

In some implementations, process 500 includes sending, to a certificate authority, a request to generate and provide the certificate, wherein the request is including the certification protocol; receiving, from the certificate authority, the certificate; and generating the certificate profile to include the certificate and the certification protocol.

In some implementations, the certificate authority is a first intermediate certificate authority (ICA) associated with a first network infrastructure and process 500 includes instantiating a second intermediate certificate authority associated with a second network infrastructure that is different from the first network infrastructure.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, a notification that a network function of a network has been instantiated to facilitate communication via the network,
wherein the notification includes an identifier associated with the network function;

determining, by the device and based on identifying the identifier in a data structure, a type of the network function, an operation to be performed by the network function, and a communication protocol associated with the network function;

determining, by the device to obtain a certificate for the network function, wherein the determining is based on:
   determining the type of the network function,
   determining the operation to be performed by the network function,
   determining that the communication protocol is associated with the network function, and
   determining that the communication protocol is not a protocol for communicating with a certificate authority;

generating, by the device and based on receiving the notification that the network function of the network has been instantiated, a key pair that includes a private key and a public key;

storing, by the device, the private key;

transmitting, by the device and to a private certificate authority, a request for the certificate,
   wherein the private certificate authority, the device, and the network function are associated with a same host platform, and
   wherein the request for the certificate includes:
      information identifying the network function,
      information identifying the device,
      information identifying the communication protocol associated with the network function; and
      the public key;

receiving, by the device and from the private certificate authority, the certificate,
   wherein the certificate is received based on a verification of an identity of the network function that is based on a determination that the network function and the private certificate authority are included in another network associated with a service provider,
      wherein the determination that the network function and the private certificate authority are included in the other network associated with the service provider is based on determining that the private certificate authority and the network function are of a same host platform;

generating, by the device, a certificate profile to enable other network functions of the network to authenticate communications with the network function,
   wherein the certificate profile identifies:
      the certificate,
      a certification protocol associated with the private certificate authority, and
      the private key; and providing, by the device and to the network function, the certificate profile to cause the network function to use the certificate to communicate with the other network functions.

2. The method of claim 1,
wherein receiving the notification that the network function has been instantiated comprises:
   receiving, from a network function orchestrator of the network, the notification.

3. The method of claim 1, further comprising:
generating a request for the certificate,
   wherein the request for the certificate identifies an application programming interface of the network function; and
   wherein the private certificate authority is configured to generate the certificate based on the application programming interface.

4. The method of claim 1,
wherein the other network functions are configured to authenticate the communications with the network function based on the other network functions providing the certificate to the certificate authority in association with the certification protocol.

5. The method of claim 1,
wherein the certification protocol comprises at least one of:
   a certificate management protocol,
   a simple certificate enrollment protocol, or
   an enrollment over secure transport protocol.

6. The method of claim 1,
wherein the certificate authority is a first intermediate certificate authority associated with a first network infrastructure, the method further comprising:
instantiating a second intermediate authority associated with a second network infrastructure that is different from the first network infrastructure.

7. The method of claim 1,
wherein the network function comprises a virtual network function of a core network of the network.

8. A device, comprising:
one or more memories; and
one or more processors configured to:
   receive a notification that a containerized network function of a network has been instantiated to facilitate communication via the network;
      wherein the notification includes an identifier associated with the containerized network function;
   determine, based on identifying the identifier in a data structure, a type of the containerized network function, an operation to be performed by the containerized network function, and a communication protocol associated with the containerized network function;
   determine to obtain a certificate for the containerized network function based on determining that the communication protocol is not a protocol for communicating with a certificate authority;
   generate a certificate profile to enable other containerized network functions of the network to authenticate communications with the containerized network function,
      wherein the containerized network function and the other containerized network functions are associated with a containerized core network infrastructure,
      wherein the certificate profile identifies a private certificate authority associated with the containerized core network infrastructure and includes:
         the certificate of the containerized network function, information identifying a certification protocol of the containerized core network infrastructure, and
         a private key, and
      wherein the certificate is obtained based on a verification of an identity of the containerized network function that is based on a determination that the containerized network function and the private certificate authority are included in another network associated with a service provider,
         wherein the determination that the containerized network function and the private certificate authority are included in the other network associated with the service provider is based on determining that the private certificate authority and the containerized network function are of a same host platform; and provide, to the containerized network function, the certificate profile to cause the containerized network function to use the certificate profile to communicate with the other containerized network functions.

9. The device of claim 8,
wherein the containerized network function is associated with a proxy of the containerized core network infrastructure, and
wherein the certificate is associated with the proxy.

10. The device of claim 8,
wherein the one or more processors, when generating the certificate profile, are configured to:
identify a proxy associated with the containerized network function;
determine the certification protocol based on the proxy; and
generate the certificate of the containerized network function based on the certification protocol.

11. The device of claim 8,
wherein the one or more processors, when generating the certificate profile, are configured to:
determine the certification protocol based on the type of the containerized network function; and
generate the certificate of the containerized network function based on the certification protocol.

12. The device of claim 8,
wherein the private certification authority is a dedicated certificate authority that is associated with a manager of the containerized core network infrastructure.

13. The device of claim 8,
wherein the containerized network function and the other containerized network functions are configured to authenticate the communications within the containerized core network infrastructure based on:
the certification protocol,
the certificate of the containerized network function, and
individual certificates of the other network functions.

14. The device of claim 8,
wherein the one or more processors are further configured to:
send, to the private certificate authority, a request to generate and provide the certificate,
wherein the request includes the communication protocol; and receive, from the private certificate authority, the certificate.

15. A non-transitory computer-readable medium storing instructions, the instructions comprising:
one or more instructions that, when executed by one or more processors, cause the one or more processors to:
receive a notification that a network function of a network has been instantiated to facilitate communication via the network;
wherein the notification includes an identifier associated with the network function;
determine, based on identifying the identifier in a data structure, a type of the network function, an operation to be performed by the network function, and a communication protocol associated with the network function;

obtain a certificate profile to enable other network functions of the network to authenticate communication with the network function, based on:
determining the type of the network function,
determining the operation to be performed by the network function,
determining that the communication protocol is associated with the network function, and
determining that the communication protocol is not a protocol for communication with a certificate authority,
wherein the certificate profile identifies:
a private key,
a certificate for the network function,
a certification protocol for authentication the communications, and
a private certificate authority associated with the certification protocols, and
wherein the certificate is obtained based on a verification of an identity of the network function that is based on a determination that the network function and the private certificate authority are included in another network associated with a service provider,
wherein the determination that the network function and the private certificate authority are included in the other network associated with the service provider is based on determining that the private certificate authority and the network function are of a same host platform; and
provide, to the network function, the certificate profile to cause the network function to use the certification protocol and a certificate to communicate with the other network functions.

16. The non-transitory computer-readable medium of claim 15,
wherein the one or more instructions, that cause the one or more processors to obtain the certificate profile, cause the one or more processors to:
send, to the private certificate authority, a request to generate and provide the certificate,
wherein the request includes the communication protocol associated with the network function; and
receive, from the certificate authority, the certificate.

17. The non-transitory computer-readable medium of claim 15,
wherein the one or more instructions, that cause the one or more processors to obtain the certificate profile, cause the one or more processors to:
identify, from a key data structure, an available key configuration for the certificate; and
generate the certificate according to the available key configuration and the certification protocol.

18. The non-transitory computer-readable medium of claim 15,
wherein the other network functions are configured to authenticate the communications with the network function based on providing the certificate to the private certificate authority via the certification protocol.

19. The non-transitory computer-readable medium of claim 15,
wherein the certification protocol comprises at least one of:
a certificate management protocol,
a simple certificate enrollment protocol, or
an enrollment over secure transport protocol.

20. The non-transitory computer-readable medium of claim 15,
wherein the network function comprises at least one of:
a virtual network function, or
a containerized network function.

* * * * *